April 14, 1925.  F. W. GURNEY  1,533,185
BALL BEARING SEPARATOR
Filed Oct. 29, 1921
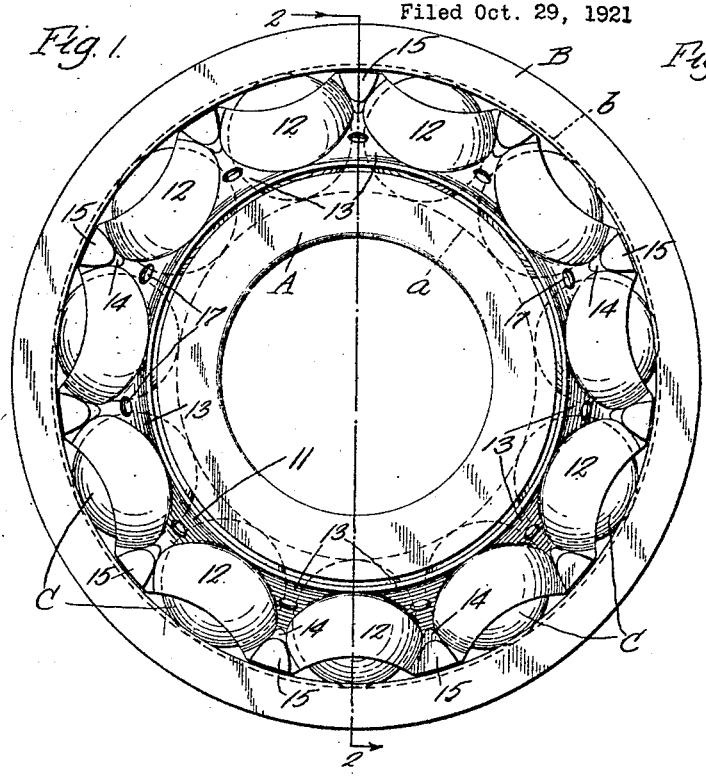
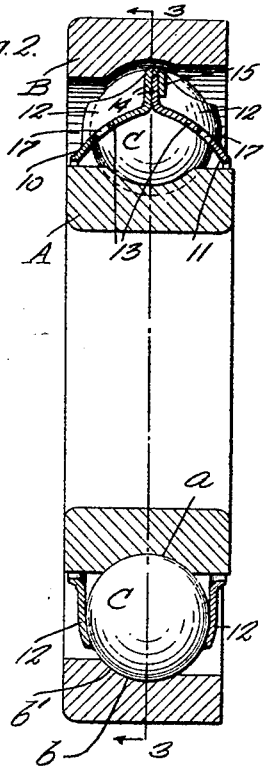
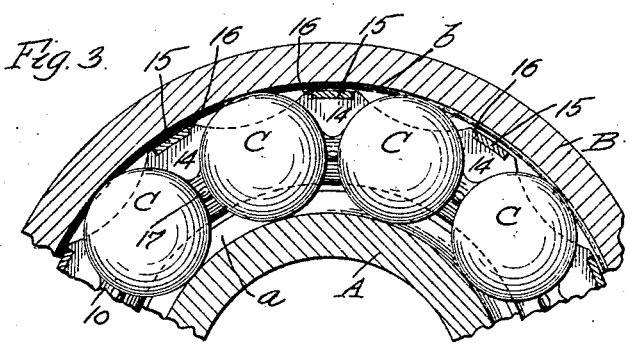
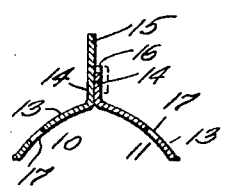
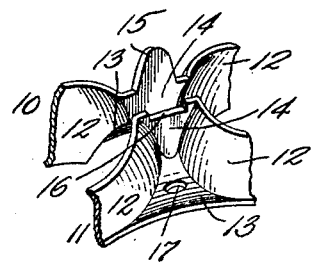
INVENTOR
Frederick W. Gurney,
by Parker & Bochurd.
his ATTORNEYS.

Patented Apr. 14, 1925.

1,533,185

UNITED STATES PATENT OFFICE.

FREDERICK W. GURNEY, OF JAMESTOWN, NEW YORK, ASSIGNOR, BY MESNE ASSIGNMENTS, TO MARLIN-ROCKWELL CORPORATION, OF JAMESTOWN, NEW YORK, A CORPORATION OF NEW YORK.

BALL-BEARING SEPARATOR.

Application filed October 29, 1921. Serial No. 511,482.

*To all whom it may concern:*

Be it known that I, FREDERICK W. GURNEY, a citizen of the United States, residing at Jamestown, in the county of Chautauqua and State of New York, have invented a new and useful Improvement in Ball-Bearing Separators, of which the following is a specification.

This invention relates to ball separators or spacing devices for the balls of ball bearings, and particularly to ball separators of that kind which are composed of sheet metal stamped or shaped to form spaced confining pockets for the balls.

Some of the ball separators heretofore used, especially those which are constructed to ride on the inner portions of the balls nearest the center of the bearing, if the separators are loose, give much trouble due to the separators running out of center and oftentimes rubbing on the inner bearing ring. The principal reason for this is because the pockets of the separator cannot be made of sufficient depth, and therefore their bearing upon the balls is too near the circular line on which the centers of the circular series of balls are located. The resistance to the separator going out of center is offered by a practically tangential contact with the balls. The bearing pressure of the separator on each ball should be exerted in a direction more nearly toward the center of the ball or approximate more nearly to a radial pressure upon the ball.

One object of the invention is to produce a ball separator which is of light, simple and inexpensive construction but will nevertheless be strong and durable and insure a more dependable and easier centering of the separator upon the circle of balls and a more positive separation of the balls. Other objects are to make a strong, rigid ball separator which is composed of only two stamped or formed pieces of metal which are firmly and rigidly secured together by interengaging, integral portions of said pieces and without any riveting or separate fastening devices whatever; also to form the separator so that it rides upon or engages the balls outwardly beyond the circular line of the centers of the balls, thereby securing larger contact areas between the separator and the balls and a more nearly radial pressure of the separator on the balls and insuring a stronger construction and more positive separation of the balls and concentricity of the separator; and also to improve ball separators in the other respects hereinafter described and set forth in the claims.

In the accompanying drawings:—

Fig. 1 is an end elevation of a ball bearing provided with a ball separator embodying the invention.

Fig. 2 is a sectional elevation thereof on line 2—2, Fig. 1.

Fig. 3 is a fragmentary sectional elevation thereof on line 3—3, Fig. 2.

Fig. 4 is a fragmentary perspective view showing the two parts of the separator before the same are secured together.

Fig. 5 is a fragmentary section of the separator showing by full and broken lines the manner of securing together the two parts thereof.

A and B represent respectively the inner and outer bearing or race rings, and C the balls of an annular ball bearing of known construction. The bearing illustrated is a combined radial and thrust bearing, and as is common in bearings of this sort, the inner and outer bearing rings A and B are provided with circumferential grooves $a$ and $b$ respectively, which form the race for the balls, the outer bearing ring being provided at one side of the annular series of balls with a thrust shoulder $b'$ which takes the end thrust on the bearing, the outer ring being counterbored or of larger internal diameter at the other side of the balls to facilitate the assembling of the parts of the bearing.

The ball separator is composed of two oppositely disposed, connected, annular, thin or sheet metal parts or rings 10 and 11, each of which is stamped, pressed or otherwise suitably shaped to form outwardly curved or cupped portions 12 connected and spaced apart by intervening webs. The inner parts 13 of these connecting webs flare laterally from the middle portion of the ring to the inner edge of the ring and diverge or increase in width towards said inner edge, being narrowest between the widest parts of the pocket portions 12, and the outer parts 14 of the connecting webs diverge outwardly from the middle portion of the ring and are disposed in a plane perpendicular to the axis of the bearing. When the two rings or parts 10 and 11 of the separator are placed together, the outer web parts 14, which preferably have flat inner faces, bear against each other face to face in a plane perpendicular to the axis of the bearing and midway between the ends of the separator, while the pocket portions 12 are disposed in pairs opposite each other and form pockets or confining recesses of segmental spherical contour for the balls. The two rings are rigidly secured together in this relation by integral parts of the rings which are engaged or interlocked with each other. Preferably the outer web parts 14 of one of the separator rings 10 are formed with outward extensions or tongues 15 adapted to be bent over the edges of the web parts 14 of the other ring 11 for securing the rings together, and the outer edges of the web parts 14 of the ring 11 are provided with peripheral notches 16 in which the securing tongues 15 seat when bent over to securing position. The engagement of the tongues 15 in the notches 16 prevents any shifting or relative movement of the rings circumferentially relatively to each other, and since the broad web portions 14 bear against each other, face to face, and are pressed and held together by the bent-over tongues 15, the two parts of the separator will be very firmly and rigidly held in place against relative movement in any direction. The contacting web portions 14 of the rings can, if desired, be spot welded, but this is not essential, since the connection formed by the bent-over tongues seated in the notches as explained, produces a very secure connection of the parts of the separator. The flaring inner web parts 13 are preferably provided with small holes 17 for lubrication and for the cleansing of the bearing in the washing process after assembling.

By forming the rings or parts of the separator and connecting them as described, the separator, although made of comparatively thin metal and being of light weight, is exceedingly stiff, or rigid, and strong. Since the inner and outer web parts 13 and 14 extend at different angles to the curved pocket-forming portions 12, the former parts 13 perpendicularly to the axis of the separator, and the latter parts 14 laterally of the portions 12, the several parts mutually cooperate in stiffening and strengthening the separator in practically all directions. Therefore, the probability of distorting or deforming the separators is very remote.

As shown by the drawings, the separator is supported by or rides on the outer hemispheres of the balls C. This gives various advantages. The points of contact of adjacent balls with the outer race ring are much farther apart than the points of contact of the balls with the inner ring. Consequently, the areas of the spaces between the outer hemispheres of the balls are larger than the areas of the spaces between the inner hemispheres. Fig. 3 of the drawings clearly shows this. It is therefore practicable to work much further up on the outer hemispheres and thereby secure larger contact areas between the separators and the balls, thus insuring a more positive separation. The securing tongues 15 can also be made much wider and stronger. In Fig. 3 it is clearly shown how there is available between adjacent balls and the outer ring a broad, triangular space, while between adjacent balls and the inner ring the space is much narrower, the angle between the balls in the one case being obtuse and in the other case acute. In my separator I utilize this broad obtuse-angular space to get in the means for fastening the two parts of the separator together, and I also use the wide angle between the balls in this space to secure what I may call a wide saddle by which the separator rides the balls.

A separator has to ride the balls with some looseness or clearance because of the manufacturing variations or discrepancies practically unavoidable in commercial production, but it can readily be seen that riding on these broad and obtuse angle saddles this necessary looseness incurs a less tendency for the separator to run out of center than if the bearing on the balls were nearer the line through their centers where the bearing would be less direct and more tangential. Therefore, a loosely fitted separator of this design will run much truer to center than one which has bearing on the balls nearer the line through their centers. When used in bearings of the type illustrated, in which the outer ring has the thrust shoulder at one side and is counterbored at the other side, the separator can be made of an outer diameter practically equal to the counterbore diameter of the outer ring. This permits the separator to extend very far up on the outer hemispheres of the ball, thus enabling the maximum width for the securing tongues, and the maximum number of balls.

I claim as my invention:

1. A ball separator for ball bearings comprising opposite metal rings formed with opposed portions forming ball confining pockets, and intervening webs connecting said pocket portions, and means consisting of interengaging integral parts of said rings for securing the rings together at their outer edge portions with their webs contacting face to face, the inner edge portions of the rings being spaced apart and disconnected.

2. A ball separator for ball bearings comprising opposite rings formed with opposed portions forming ball confining pockets, and intervening webs connecting said pocket portions, said webs of the opposite rings having outer portions which contact with each other between the ball pockets, and inner portions which diverge from each other inwardly, and securing devices at the outer portion of the separator securing together said contacting outer portions of the webs.

3. A ball separator for ball bearings comprising opposite rings formed with opposed portions forming ball confining pockets, and intervening webs connecting said pocket portions, said webs increasing in width from points intermediate the inner and outer edges of the rings towards both of said edges and the portions of said webs of the opposite rings between said intermediate points and the inner edges of the rings diverging from each other, and means for securing the rings together with the outer portions of their webs contacting face to face.

4. A ball separator for ball bearings comprising opposite rings formed with opposed portions forming ball confining pockets, and intervening webs connecting said pocket portions, said webs of the opposite rings having outer portions which contact with each other between the ball pockets and inner portions which diverge from each other inwardly, said outer portions of the webs and the adjacent portions of the pockets between the balls extending outwardly further from the center of the separator than the portions of the pockets at the opposite sides of the separator, and means securing said rings together.

5. A ball separator for ball bearings comprising opposite metal rings formed with opposed portions forming ball confining pockets, and intervening webs connecting said pocket portions, said webs of the opposite rings having outer portions which contact face to face and inner portions which diverge from each other inwardly, and means consisting of interengaging integral parts of the contacting outer portions of the webs for securing the rings together at their outer edges.

FREDERICK W. GURNEY.